(12) United States Patent
Kato

(10) Patent No.: US 11,206,336 B2
(45) Date of Patent: Dec. 21, 2021

(54) INFORMATION PROCESSING APPARATUS, METHOD, AND NON-TRANSITORY COMPUTER READABLE MEDIUM

(71) Applicant: FUJIFILM Business Innovation Corp., Tokyo (JP)

(72) Inventor: Shingo Kato, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/921,909

(22) Filed: Jul. 6, 2020

(65) Prior Publication Data
US 2021/0289078 A1    Sep. 16, 2021

(30) Foreign Application Priority Data
Mar. 10, 2020 (JP) .............................. JP2020-040900

(51) Int. Cl.
| H04N 1/00 | (2006.01) |
| G06K 9/00 | (2006.01) |
| G06F 3/0481 | (2013.01) |
| G06F 3/0485 | (2013.01) |
| G06F 17/00 | (2019.01) |

(52) U.S. Cl.
CPC ....... H04N 1/0044 (2013.01); G06K 9/00442 (2013.01); G06F 3/0481 (2013.01); G06F 3/0485 (2013.01); G06K 2209/01 (2013.01)

(58) Field of Classification Search
CPC ............ H04N 1/0044; G06K 9/00442; G06K 2209/01; G06F 17/30424; G06F 17/30554; G06F 17/30991; G06F 3/0481; G06F 3/0485; G06F 3/4086
See application file for complete search history.

(56) References Cited

U.S. PATENT DOCUMENTS

| 10,652,409 | B2 | 5/2020 | Soga | |
| 2005/0278302 | A1* | 12/2005 | Ritter | ................... G06F 16/447 |
| 2014/0237423 | A1* | 8/2014 | Hayashi | ............. G06F 3/04886 715/802 |
| 2015/0331551 | A1* | 11/2015 | Lee | .................... G06F 3/04817 715/781 |
| 2016/0350270 | A1* | 12/2016 | Nakazawa | ........... G06F 3/0484 |

FOREIGN PATENT DOCUMENTS

| JP | 2019128715 | 8/2019 |
| JP | 2019-197989 | 11/2019 |

* cited by examiner

Primary Examiner — Quoc A Tran
(74) Attorney, Agent, or Firm — JCIPRNET

(57) ABSTRACT

An information processing apparatus includes a memory and a processor. The processor is configured to display a portion of a first document on a display based on history stored in the memory and a first attribute specified by a user. The history associates a previous document type of a previously displayed document with a previous attribute that was previously attached to the previously displayed document and a previous portion of the previously displayed document that was being displayed when the previous attribute was attached to the previously displayed document.

8 Claims, 13 Drawing Sheets

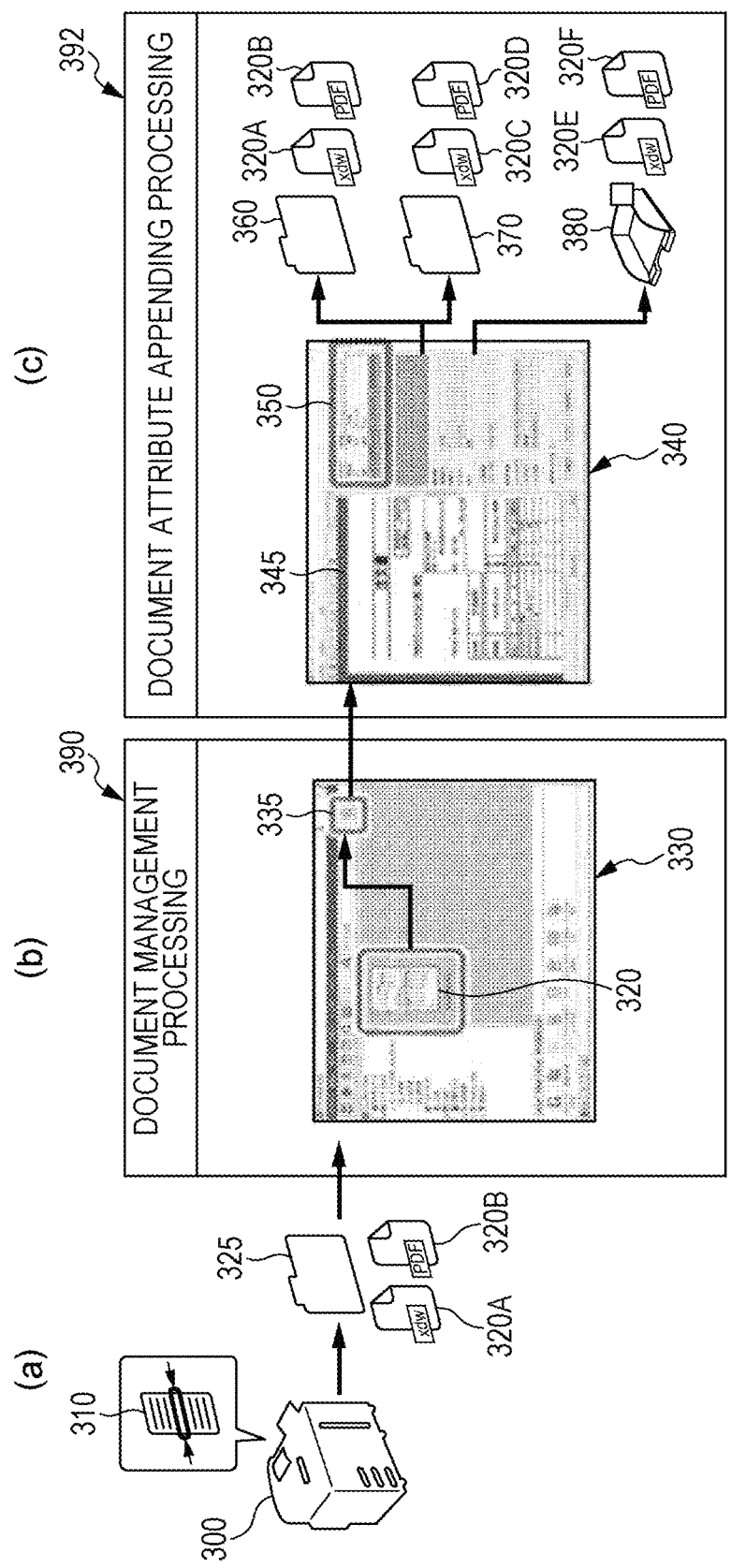

FIG. 7

| DOCUMENT TYPE | ATTRIBUTE NAME | POSITION | MAGNIFICATION FACTOR |
|---|---|---|---|
| INVOICE | ISSUER | X: 180, Y: 50 | 167 |
| INVOICE | INVOICE NO. | | |
| INVOICE | TOTAL AMOUNT | | |
| ⋮ | | | |

FIG. 11

| KEY | VALUE EXTRACTING RULE |
|---|---|
| INVOICE NUMBER | EXTRACT TEN DIGITS OF ALPHANUMERIC CHARACTERS ON THE RIGHT SIDE OF "INVOICE NUMBER" AS "INVOICE NO." |
| ⋮ | |

FIG. 12

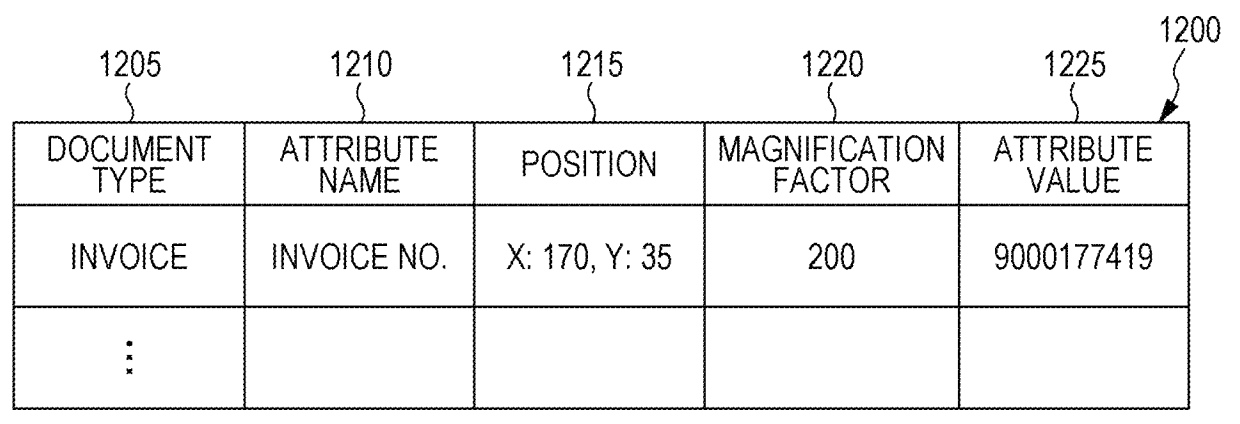

| DOCUMENT TYPE | ATTRIBUTE NAME | POSITION | MAGNIFICATION FACTOR | ATTRIBUTE VALUE |
|---|---|---|---|---|
| INVOICE | INVOICE NO. | X: 170, Y: 35 | 200 | 9000177419 |
| ... | | | | |

INFORMATION PROCESSING APPARATUS, METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-040900 filed Mar. 10, 2020.

BACKGROUND

(i) Technical Field

The present disclosure relates to an information processing apparatus and a non-transitory computer readable medium.

(ii) Related Art

Japanese Unexamined Patent Application Publication No. 2019-128715 discloses the following device that can present a character string obtained by executing optical character recognition (OCR) processing on a scanned image and used for setting a file name, for example, so that a user can easily check this character string. The device includes an extractor, a display controller, a generator, and a storage. The extractor extracts character string regions from a scanned image represented by scanned image data. The display controller displays the scanned image on a preview screen so as to allow a user to select any of the extracted character string regions. The generator generates information related to the scanned image data by using a character string of the character string region selected on the preview screen by the user. The storage stores selection information for identifying the character string region selected by the user. The display controller determines which character string region to be displayed in a state in which it is being selected, among the character string regions extracted by the extractor, based on the selection information concerning past scanned image data stored in the storage. The display controller then determines a display range of the scanned image so that the entirety of the subject character string region can be displayed on the preview screen.

Japanese Unexamined Patent Application Publication No. 2019-197989 discloses the following device that enables a user to easily select a character region on a preview screen on which scanned image data is displayed. The device is used for setting information related to image data obtained by scanning a document. The device includes a region determiner and a display. The region determiner determines multiple character regions indicated by the scanned image data. The display displays the scanned image data on a preview screen so as to allow a user to select a desired character region from among the multiple character regions determined by the region determiner. The character regions displayed for the user to select a desired character region are enlarged characters of the character regions determined by the region determiner.

SUMMARY

To check an attribute appended to a document, a portion of the document related to the attribute is displayed so as to allow a user to check the attribute against that described in this portion. In order to display the portion related to the attribute, however, the user is required to perform operations such as scrolling and enlarging.

Aspects of non-limiting embodiments of the present disclosure relate to an information processing apparatus and a non-transitory computer readable medium that are able to make it easier for a user to check an attribute appended to a document by displaying a portion of the document related to the attribute without the user having to perform operation.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a memory and a processor. The processor is configured to display a portion of a first document on a display based on history stored in the memory and a first attribute specified by a user. The history associates a previous document type of a previously displayed document with a previous attribute that was previously attached to the previously displayed document and a previous portion of the previously displayed document that was being displayed when the previous attribute was attached to the previously displayed document.

BRIEF DESCRIPTION OF THE DRAWINGS

An exemplary embodiment of the present disclosure will be described in detail based on the following figures, wherein:

FIG. 3 illustrates examples of processing in the exemplary embodiment;

FIG. 7 illustrates an example of the data structure of preview display information;

FIG. 11 illustrates an example of the data structure of a key/value extracting table;

FIG. 12 illustrates an example of the data structure of an extracting position information table.

DETAILED DESCRIPTION

An exemplary embodiment of the disclosure will be described below with reference to the accompanying drawings.

Figure 1:
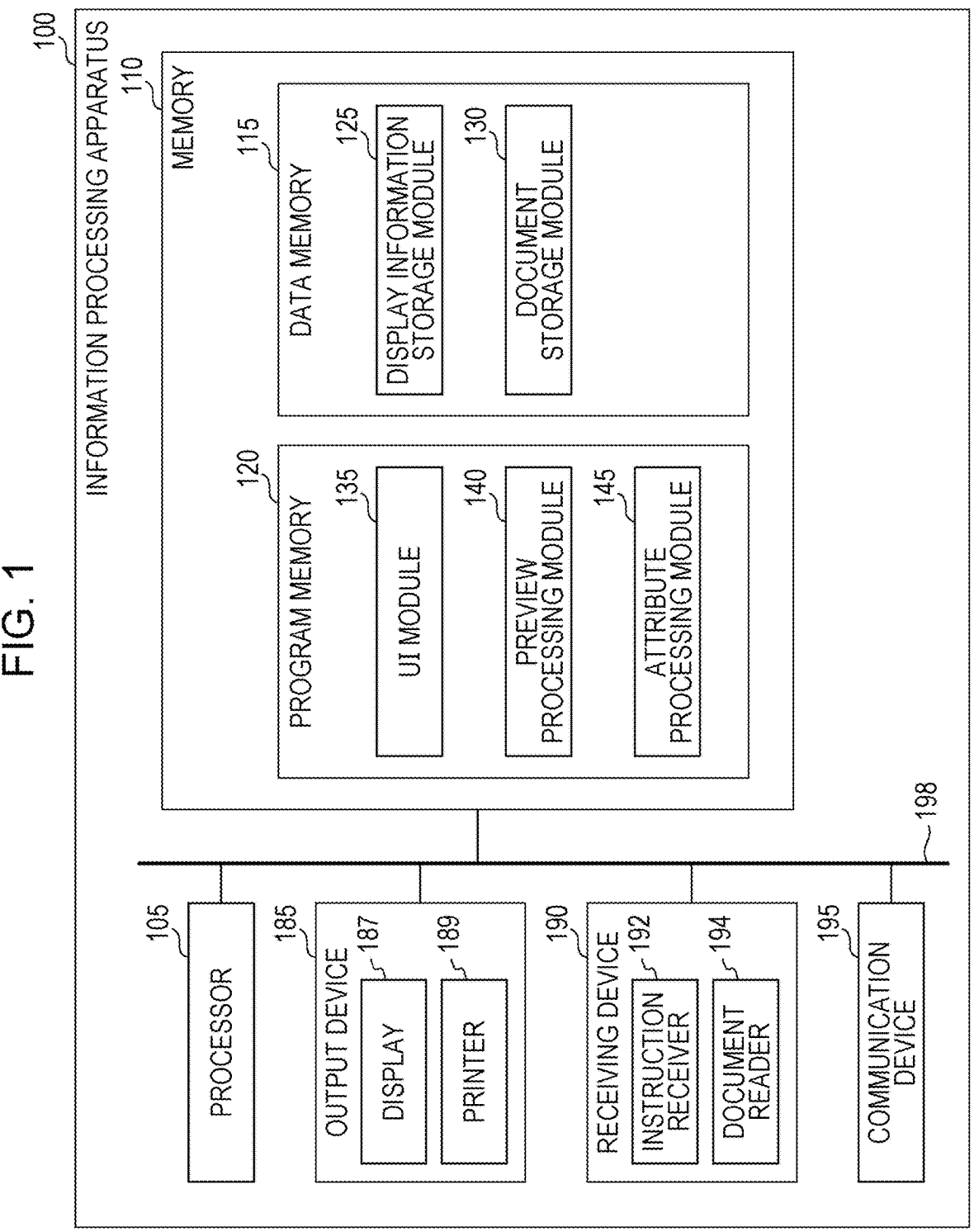
FIG. 1 is a block diagram illustrating conceptual modules forming an example of the configuration of the exemplary embodiment.

FIG. 1 is a block diagram illustrating conceptual modules forming an example of the configuration of the exemplary embodiment.

Generally, modules are software (computer programs) components or hardware components that can be logically separated from one another. The modules of the exemplary embodiment of the disclosure are, not only modules of a computer program, but also modules of a hardware configuration. Thus, the exemplary embodiment will also be described in the form of a computer program for allowing a computer to function as those modules (a program for causing a computer to execute program steps, a program for allowing a computer to function as corresponding units, or a computer program for allowing a computer to implement corresponding functions), a system, and a method. While expressions such as "store", "storing", "being stored", and equivalents thereof are used for the sake of description, such expressions indicate, when the exemplary embodiment relates to a computer program, storing the computer program in a storage device or performing control so that the computer program will be stored in a storage device. Modules may correspond to functions based on a one-to-one relationship. In terms of implementation, however, one module may be constituted by one program, or plural modules may be constituted by one program. Conversely, one module may be constituted by plural programs. Additionally, plural modules may be executed by using a single computer, or one module may be executed by using plural computers in a distributed or parallel environment. One module may integrate another module therein. Hereinafter, the term "connection" includes not only physical connection, but also logical connection (sending and receiving of data, giving instructions, reference relationships among data elements, login, etc.). The term "predetermined" means being determined prior to a certain operation, and includes the meaning of being determined prior to a certain operation before starting processing of the exemplary embodiment, and also includes the meaning of being determined prior to a certain operation even after starting processing of the exemplary embodiment, in accordance with the current situation/state or in accordance with the previous situation/state. If there are plural "predetermined values", they may be different values, or two or more of the values (or all the values) may be the same. A description having the meaning "in the case of A, B is performed" is used as the meaning "it is determined whether the case A is satisfied, and B is performed if it is determined that the case A is satisfied", unless such a determination is unnecessary. If elements are enumerated, such as "A, B, and C", they are only examples unless otherwise stated, and such enumeration includes the meaning that only one of them (only the element A, for example) is selected.

A system or an apparatus (or a device) may be implemented by connecting plural computers, hardware units, devices, etc., to one another via a communication medium, such as a network (including communication connection based on a one-to-one correspondence), or may be implemented by a single computer, hardware unit, device, etc. The terms "apparatus" and "system" are used synonymously. The term "system" does not include a mere man-made social "mechanism" (social system).

Additionally, every time an operation is performed by using a corresponding module or every time each of plural operations is performed by using a corresponding module, target information is read from a storage device, and after performing the operation, a processing result is written into the storage device. A description of reading from the storage device before an operation or writing into the storage device after an operation may be omitted.

An information processing apparatus 100 according to the exemplary embodiment has a preview display function of displaying a portion of a document related to an attribute appended to the document so that a user can check the attribute. As shown in FIG. 1, the information processing apparatus 100 at least includes a processor 105 and a memory 110. A bus 198 connects the processor 105 and the memory 110 so that they can exchange data therebetween. The information processing apparatus 100 may also include an output device 185, a receiving device 190, and a communication device 195. Data is exchanged between the processor 105, the memory 110, the output device 185, the receiving device 190, and the communication device 195 via the bus 198.

FIG. 1 also illustrates an example of the hardware configuration of a computer implementing the exemplary embodiment. The computer on which a program serving as the exemplary embodiment is executed has the hardware configuration shown in FIG. 1, for example, and more specifically, the computer is a personal computer (PC) or a server. The computer shown in FIG. 1 includes the processor 105 as a processing unit and the memory 110 as a storage device.

As the processor 105, one or multiple processors may be used. The processor 105 may include a central processing unit (CPU) or a microprocessor, for example. If multiple processors 105 are used, they may be implemented as either one of a tightly coupled multiprocessor and a loosely coupled multiprocessor. For example, multiple processor cores may be loaded within a single processor 105. A system in which plural computers connect with each other by a communication channel so as to virtually behave like one computer may be utilized. As a specific example, multiple processors 105 may be a loosely coupled multiprocessor and be formed as a cluster system or a computer cluster. The processor 105 executes programs stored in a program memory 120.

The memory 110 may include semiconductor memory units within the processor 105, such as a register and a cache memory. The memory 110 may include a main memory device (main storage device) constituted by a random access memory (RAM) and a read only memory (ROM), for example, an internal storage device, such as a hard disk drive (HDD) and a solid state drive (SDD), having a function as a persistent storage, an external storage device and an auxiliary storage device, such as a compact disc (CD), a digital versatile disk (DVD), a Blue-ray (registered trademark) disc, a universal serial bus (USB) memory, and a memory card. The memory 110 may also include a storage, such as a server, connected to the computer via a communication network.

The memory 110 includes as major elements a program memory 120 principally storing programs and a data memory 115 principally storing data. In the program memory 120 and the data memory 115, in addition to the module programs shown in FIG. 1, programs, such as an operating system (OS) for starting the computer, and data, such as parameters that appropriately change during the execution of the module programs, may be stored.

The output device 185 includes a display 187 and a printer 189, for example. The display 187 is a liquid crystal display, an organic electroluminescence (EL) display, or a three-dimensional (3D) display, for example. The display 187 displays processing results of the processor 105 and data stored in the data memory 115 as text or image information, for example. The printer 189 is a printer or a multifunction device, which is an image processing device having at least two of the functions of a scanner, a printer, a copying machine, and a fax machine. The printer 189 prints processing results of the processor 105 and data stored in the data memory 115, for example. The output device 185 may include an actuator for vibrating a speaker and other equipment.

The receiving device 190 includes an instruction receiver 192 and a document reader 194. The instruction receiver 192, such as a keyboard, a mouse, a microphone, and a camera (including a gaze detection camera), receives data based on an operation (including motion, voice, and gaze) performed on the instruction receiver 192 from a user.

A device having both the functions of the display 187 and the instruction receiver 192, such as a touchscreen, may be used. In this case, to implement the function of the keyboard, a keyboard drawn on the touchscreen by using software, that is, a software keyboard or a screen keyboard, may be used instead of a physical keyboard.

As a user interface (UI), the display 187 and the instruction receiver 192 are principally used.

The document reader 194, such as a scanner and a camera, reads a document or captures an image of the document and receives resulting image data.

The communication device 195 is a communication network interface, such as a network card, for enabling the computer to connect to another apparatus via a communication network.

In the above-described exemplary embodiment, concerning elements implemented by a software computer program, such a computer program is read into the program memory 120 having the hardware configuration shown in FIG. 1, and the exemplary embodiment is implemented by a combination of software and hardware resources.

The hardware configuration of the information processing apparatus 100 in FIG. 1 is only an example, and the exemplary embodiment may be configured in any manner if the modules described in the exemplary embodiment are executable. For example, as the processor 105, a graphics processing unit (GPU) or a general-purpose computing on graphics processing unit (GPGPU) may be used. Some modules may be configured as dedicated hardware, for example, an application specific integrated circuit (ASIC) or a field-programmable gate array (FPGA), or some modules may be installed in an external system and be connected to the information processing apparatus 100 via a communication network. A system, such as that shown in FIG. 1, may be connected to a system, such as that shown in FIG. 1, via a communication network, and may be operated in cooperation with each other. Additionally, instead of into a PC, the modules may be integrated into a mobile information communication device (including a cellular phone, a smartphone, a mobile device, and a wearable computer), a home information appliance, a robot, a copying machine, a fax machine, a scanner, a printer, and a multifunction device.

The processor 105 is connected to the memory 110, the output device 185, the receiving device 190, and the communication device 195 via the bus 198. The processor 105 executes processing in accordance with a computer program describing an execution sequence of each module, which is a program stored in the program memory 120. For example, in response to the instruction receiver 192 receiving an instruction from a user, the processor 105 executes processing by using the module within the program memory 120 corresponding to the received instruction, and stores the processing result in the data memory 115, outputs it to the display 187, or causes the communication device 195 to send it to another apparatus.

The memory 110 includes the data memory 115 and the program memory 120 and is connected to the processor 105, the output device 185, the receiving device 190, and the communication device 195 via the bus 198.

The data memory 115 includes a display information storage module 125 and a document storage module 130.

The display information storage module 125 stores information for displaying a document. More specifically, the display information storage module 125 stores history which associates a previous document type of a previously displayed document with a previous attribute that was previously attached to the previously displayed document and a previous portion of the previously displayed document that was being displayed when the previous attribute was attached to the previously displayed document. Displaying a document is also called displaying a preview (preview display). Information stored in the display information storage module 125 will also be called display portion information and be discussed later with reference to FIG. 7.

A document type refers to a category of documents having the same configuration. Documents created by using the same document format (also called a form, a template, and a pattern) is the same document type. Examples of document types are an invoice, a quotation, and a receipt. Document type information indicating a document type will also be simply called a document type.

Attribute information is information appended to a document without changing the content of the document. The content of attribute information is information concerning a document and may include information described in the document. More specifically, attribute information at least includes an attribute name and may be a combination of the attribute name and an attribute value.

Appending attribute information to a document is one of the following three operations: (1) appending an attribute name to a document; (2) appending an attribute value corresponding to an attribute name to a document if the attribute name has already been appended to the document; and (3) appending a combination of an attribute name and an attribute value to a document. For example, if "Invoice No." is appended to a document as the attribute name, "9000177419" is appended as the attribute value.

"A previous portion of the previously displayed document that was being displayed when the previous attribute was attached to the previously displayed document" is the following portion. When a user is appending attribute information to a document, this document is being displayed, and more specifically, a portion of the document related to the attribute information is displayed. A specific example of such a portion is a portion of a document displayed on a preview screen.

As information indicating a portion of a document may be any type of information that can serve to reproduce the display state of the portion of the document displayed on the display 187. For example, information indicating the position of a document displayed on the display 187 may be the information indicating a portion of the document. The position of the document may be the coordinates of a corner (the top left corner, for example) of a rectangular region of the document displayed on the display 187. The information indicating a portion of a document may also include the magnification and/or the size of the portion.

The document storage module 130 stores a document to be appended with an attribute or a document to be displayed.

A document (also called a file) is text data, numerical value data, graphics data, image data, video data, sound data, or a combination thereof. A document is a subject that can be stored, edited, and searched for and can also be exchanged between systems or users as an individual unit. The concept of documents also include their equivalents. Specific examples of documents are documents created by a document creating program, that is, word-processing software, images read by an image reader, such as a scanner, and web pages.

The program memory 120 stores a UI module 135, a preview processing module 140, and an attribute processing module 145.

The UI module 135 executes processing concerning UIs. As input processing, the UI module 135 executes processing concerning an operation received by the instruction receiver 192. For example, the UI module 135 causes the attribute processing module 145 to execute processing in accordance with the operation received by the instruction receiver 192. As output processing, the UI module 135 causes the display 187 to display a document in accordance with the result of processing executed by the attribute processing module 145.

The preview processing module 140 performs control to display a document on the display 187. The preview processing module 140 executes control to display a portion of a document on a display based on the history (display portion information) stored in the display information storage module 125 and an attribute specified by a user. The display information storage module 125 stores display portion information in association with document type information and attribute information. Accordingly, if document type information and attribute information are specified, the associated display portion information can be extracted.

The preview processing module 140 may also add, to the history in the display information storage module 125, information on a document to associate a portion of this document that was being displayed when an attribute was appended to the information with a document type of this document and the attribute that was attached to the document.

Subjects to be stored in the display information storage module 125 are document type information and attribute information concerning a document to be displayed and display portion information indicating a portion of the document. More specifically, when a user is appending an attribute to a document A displayed on a display, document type information indicating the document type of document A, attribute information indicating an attribute to be appended to the document A, and a portion of the document A which is being displayed on the display are stored in association with each other. It is now assumed that a user is appending the attribute information appended to the document A to a document B, which is different from the document A but has the same document type as the document A. In this case, a portion of the document B is displayed in accordance with the display portion information concerning the document A stored in the display information storage module 125. If different documents have the same document type, the positions of the documents at which the attribute is described are also likely to be the same. Thus, the same position as that of the displayed portion of the document A is also displayed for the document B so that the user can check the same attribute. To display the document A again, if the same attribute information as that stored in the display information storage module 125 is specified, the portion of the document A indicated by the display portion information stored in the display information storage module 125 is displayed, since the document type information is the same. That is, the display state of the document at the time when the attribute is appended to the document is reproduced.

When a document is an image, the attribute processing module 145 may perform character recognition on the document. When displaying a portion of the document, the preview processing module 140 may execute second control to display a portion that includes a character string that corresponds to an attribute specified by the user, by using a character recognition result obtained by the attribute processing module 145.

The meaning of a character string in the character recognition result corresponding to attribute information will be explained below. Attribute information and a predetermined character string are associated with each other in advance, and when the predetermined character string is found as a result of conducting character recognition, it is the character recognition result corresponding to the attribute information. For example, the attribute name is "Invoice No.", and the predetermined character string is "Invoice No.". Attribute information may be associated with plural character strings. For example, the attribute name is "Invoice No.", and the predetermined character strings are "Invoice No." and "Invoice number". The position at which the character recognition result is placed is a position at which a character image subjected to character recognition processing is placed. For example, instead of text information indicating a character string, a position (more specifically, coordinates) of a document at which a character image indicating the character string is placed can be used as the character recognition result. That is, by using this position, a portion of a document located at a position at which the character recognition result corresponding to attribute information specified by a user is placed is displayed on the display 187.

The preview processing module 140 may execute the above-described second control in response to a predetermined character string and a character string having a predetermined positional relationship with the predetermined character string having been extracted. A specific example of a rule for extracting a predetermined character string and a character string having a predetermined positional relationship with the predetermined character string will be discussed later with reference to FIG. 11.

The attribute processing module 145 appends an attribute to a subject document in accordance with an instruction from a user.

When a document is an image, the attribute processing module 145 may perform character recognition processing on the document. The attribute processing module 145 may then extract a character recognition result that matches a predetermined character string A and a character string B having a predetermined positional relationship with the character string A as attribute information.

Figure 2A:
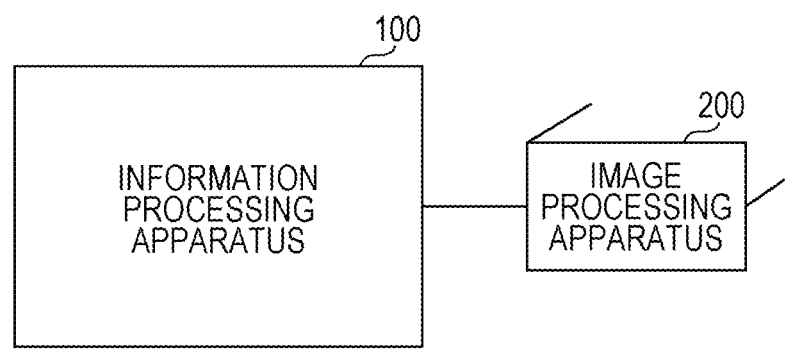
FIGS. 2A and 2B are schematic diagrams illustrating examples of the system configuration utilizing the exemplary embodiment.
Figure 2B:
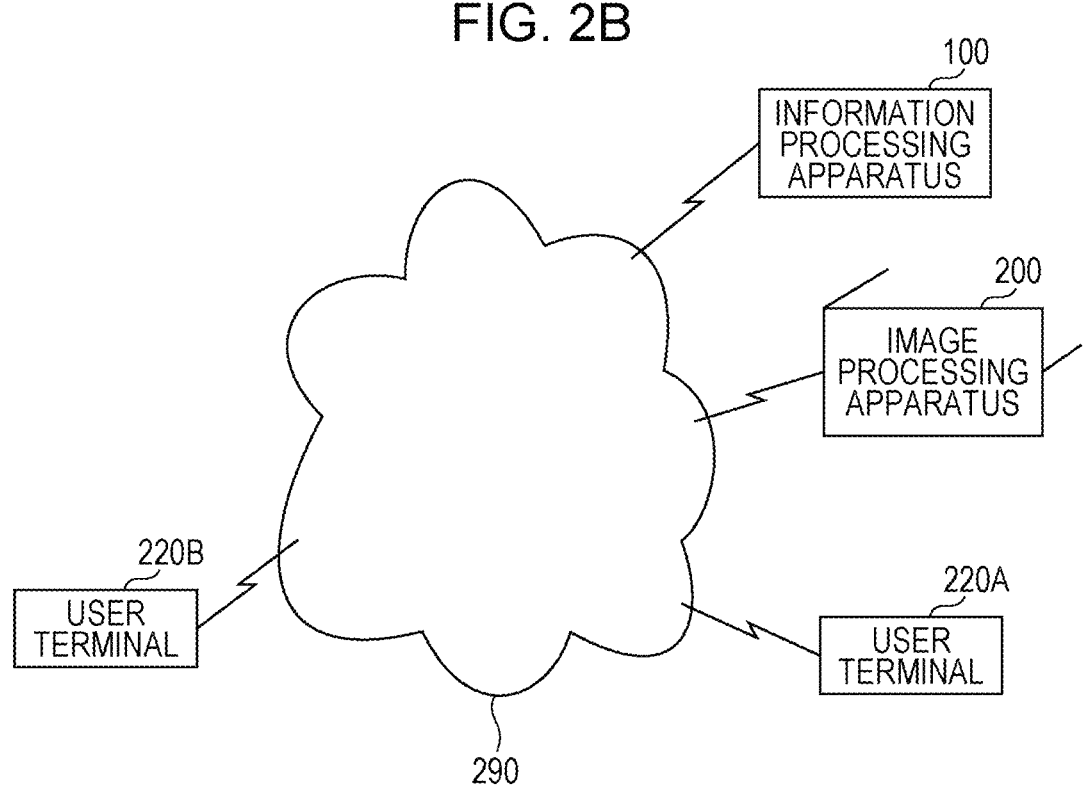

FIGS. 2A and 2B are schematic diagrams illustrating examples of the system configuration utilizing the exemplary embodiment.

FIG. 2A illustrates an example of the standalone system configuration. The information processing apparatus 100 and an image processing apparatus 200 are connected with each other. The image processing apparatus 200 has a scanning function and a printing function, for example. The image processing apparatus 200 is a multifunction device, for example. The information processing apparatus 100 implements the functions as the printer 189 and the document reader 194 by using the image processing apparatus 200. The information processing apparatus 100 may be integrated in the image processing apparatus 200, so that document preview display can be performed only with the image processing apparatus 200.

The information processing apparatus 100 has an automatic switching function of the preview display position. More specifically, the information processing apparatus 100 causes the display information storage module 125 to store the preview position specified by a user when the user is inputting an attribute of a document, in association with the document type and the attribute name of the document. The information processing apparatus 100 then reads preview display position information based on the document type and the attribute name so as to switch the preview display position. A document A whose preview display position information is stored in the display information storage module 125 and a document B to be displayed afterwards may be different from each other. However, the document type of document A and that of document B are the same, and the attribute name specified by a user when the user is inputting an attribute of the document A (namely, the attribute name stored in the display information storage module 125) and the attribute name of the document B specified by the user are the same. That is, although the document B is different from the document A, the document B has the same document type and the same attribute name as the document A. Accordingly, when checking a portion of the document B having the same attribute name as that of the document A, the user can refer to the same portion of the document A.

FIG. 2B illustrates an example of the network system configuration. The information processing apparatus 100, the image processing apparatus 200, and user terminals 220A and 220B are connected with each other via a communication network 290. The communication network 290 may be a wireless or wired medium, or a combination thereof, and may be, for example, the Internet or an intranet as a communication infrastructure. The functions of the information processing apparatus 100 may be implemented as cloud services.

For example, a user causes the scanner function of the image processing apparatus 200 to read a paper document and stores the read image of the document. The user then extracts the document stored in the image processing apparatus 200 and provides an instruction to append an attribute to the document by using the user terminal 220. For example, the user connects to the information processing apparatus 100 by using a browser of the user terminal 220, and appends an attribute to the document by using the function of the information processing apparatus 100.

FIG. 3 illustrates examples of processing in the exemplary embodiment. More specifically, FIG. 3 illustrates document management processing and document attribute appending processing.

As document management, digitizing of paper documents by scanning is very common. After a paper document is digitized, attribute information is appended to the digitized document, and this attribute information is used for sorting the document into a folder or is used as a file name or as search information.

The example shown in (a) of FIG. 3 illustrates processing for generating a document 320 from a paper document 310.

A user first causes an image processing apparatus 300 corresponding to the above-described image processing apparatus 200 to scan and digitize the paper document 310 so as to generate a document 320. The user then stores the document 320 in a predetermined folder 325. The folder 325 is provided for each user. When the document 320 is generated as a result of scanning the document 310 by a user logged in the image processing apparatus 300, it is stored in the folder 325 of this user.

The example shown in (b) of FIG. 3 illustrates document management processing 390.

The document management processing 390 is executed with the user terminal 220, for example. As a result of executing the document management processing 390, the document 320 stored in the folder 325 of the image processing apparatus 300 is read into the user terminal 220 and is displayed on a document management screen 330. The example in (b) of FIG. 3 shows that the document 320 is being managed on the document management screen 330. When the user selects a document attribute appending button 335 in the state in which the document 320 is being selected, document attribute appending processing 392 is started.

The example shown in (c) of FIG. 3 illustrates the document attribute appending processing 392.

As a result of the user selecting the document attribute appending button 335 as shown in (b) of FIG. 3, a document attribute appending screen 340 is displayed. The document attribute appending screen 340 at least includes a preview region 345 and an attribute appending region 350.

The user appends an attribute to the document 320 in the attribute appending region 350 while checking the document 320 displayed in the preview region 345. For example, the user inputs an attribute value into the attribute appending region 350 while checking the content of the document 320 in the preview region 345. Details of the attribute appending region 350 will be discussed later with reference to FIG. 4.

In the document attribute appending processing 392, the user selects a quotation folder 360 in accordance with the document type and/or the attribute of the document 320, such as a business partner, and stores the document 320 in the selected quotation folder 360. After inputting the attribute value into the document 320, the user may hand the document 320 to another user by using an order sheet tray 380.

Figure 4:
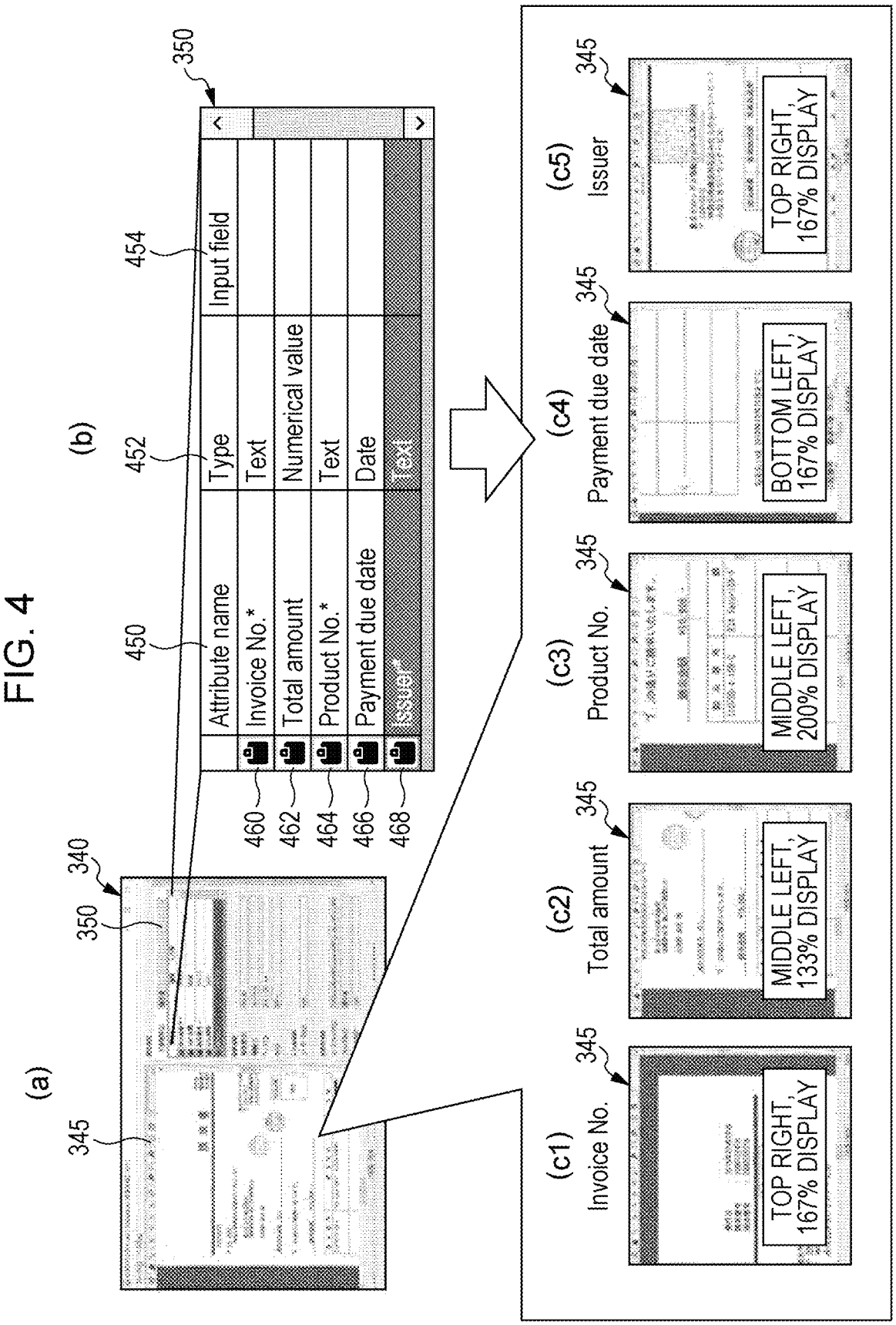
FIG. 4 illustrates an example of processing in the exemplary embodiment.

FIG. 4 illustrates an example of processing in the exemplary embodiment. More specifically, FIG. 4 illustrates a specific example of processing for appending attribute information by the document attribute appending processing 392.

In the example shown in (a) of FIG. 4, the preview region 345 and the attribute appending region 350 of the document attribute appending screen 340 are shown.

The example shown in (b) of FIG. 4 illustrates the content of the attribute appending region 350.

The attribute appending region 350 has a table format of five rows, i.e., first through fifth rows 460 through 468. Each row has an attribute name field 450, a type field 452, and an input field 454. In the attribute name field 450, attribute names are displayed. For example, the predetermined attribute names according to the document type of document 320 displayed in the preview region 345 are displayed. The user may also input another attribute name. In the type field 452, the type of attribute, that is, whether the attribute is text, a numerical value, a date, or an image, is indicated. In the input field 454, the attribute value of the attribute is input by the user.

The example in (c1) of FIG. 4 illustrates a portion of the document 320 displayed within the preview region 345 when the user is inputting an attribute value of the attribute name "Invoice No." into the input field 454 of the first row 460. More specifically, the example in (c1) of FIG. 4 shows that the user is inputting an attribute value into the input field 454 of the first row 460 in the attribute appending region 350 in the state in which the portion of the document 420 "top right, 167% display" is being displayed.

The example in (c2) of FIG. 4 illustrates a portion of the document 320 displayed within the preview region 345 when the user is inputting an attribute value of the attribute name "Total amount" into the input field 454 of the second row 462. More specifically, the example in (c2) of FIG. 4 shows that the user is inputting an attribute value into the input field 454 of the second row 462 in the attribute appending region 350 in the state in which the portion of the document 320 "middle left, 133% display" is being displayed.

The example in (c3) of FIG. 4 illustrates a portion of the document 320 displayed within the preview region 345 when the user is inputting an attribute value of the attribute name "Product No." into the input field 454 of the third row 464. More specifically, the example in (c3) of FIG. 4 shows that the user is inputting an attribute value into the input field 454 of the third row 464 in the attribute appending region 350 in the state in which the portion of the document 320 "middle left, 200% display" is being displayed.

The example in (c4) of FIG. 4 illustrates a portion of the document 320 displayed within the preview region 345 when the user is inputting an attribute value of the attribute name "Payment due date" into the input field 454 of the fourth row 466. More specifically, the example in (c4) of FIG. 4 shows that the user is inputting an attribute value into the input field 454 of the fourth row 466 in the attribute appending region 350 in the state in which the portion of the document 320 "bottom left, 167% display" is being displayed.

The example in (c5) of FIG. 4 illustrates a portion of the document 320 displayed within the preview region 345 when the user is inputting an attribute value of the attribute name "Issuer" into the input field 454 of the fifth row 468. More specifically, the example in (c5) of FIG. 4 shows that the user is inputting an attribute value into the input field 454 of the fifth row 468 in the attribute appending region 350 in the state in which the portion of the document 320 "top right, 167% display" is being displayed.

The preview position of a portion of a document displayed in the preview region 345 varies depending on the document type and the attribute. If a user appends an attribute to a document without using the information processing apparatus 100, the user is required to adjust the preview position by scrolling on the document 320 within the preview screen 345. For example, the user needs to adjust the preview position every time the document type or the attribute is switched. There may also be a case in which the size of characters in the document 320 is too small and the user has to change the magnification factor. That is, the preview position is different depending on the content of the input field of the attribute and the size of characters may be too small to read. This makes it necessary for the user to manually scroll on the document 320 within the preview region 345 and to enlarge or reduce the size of characters.

Figure 5:
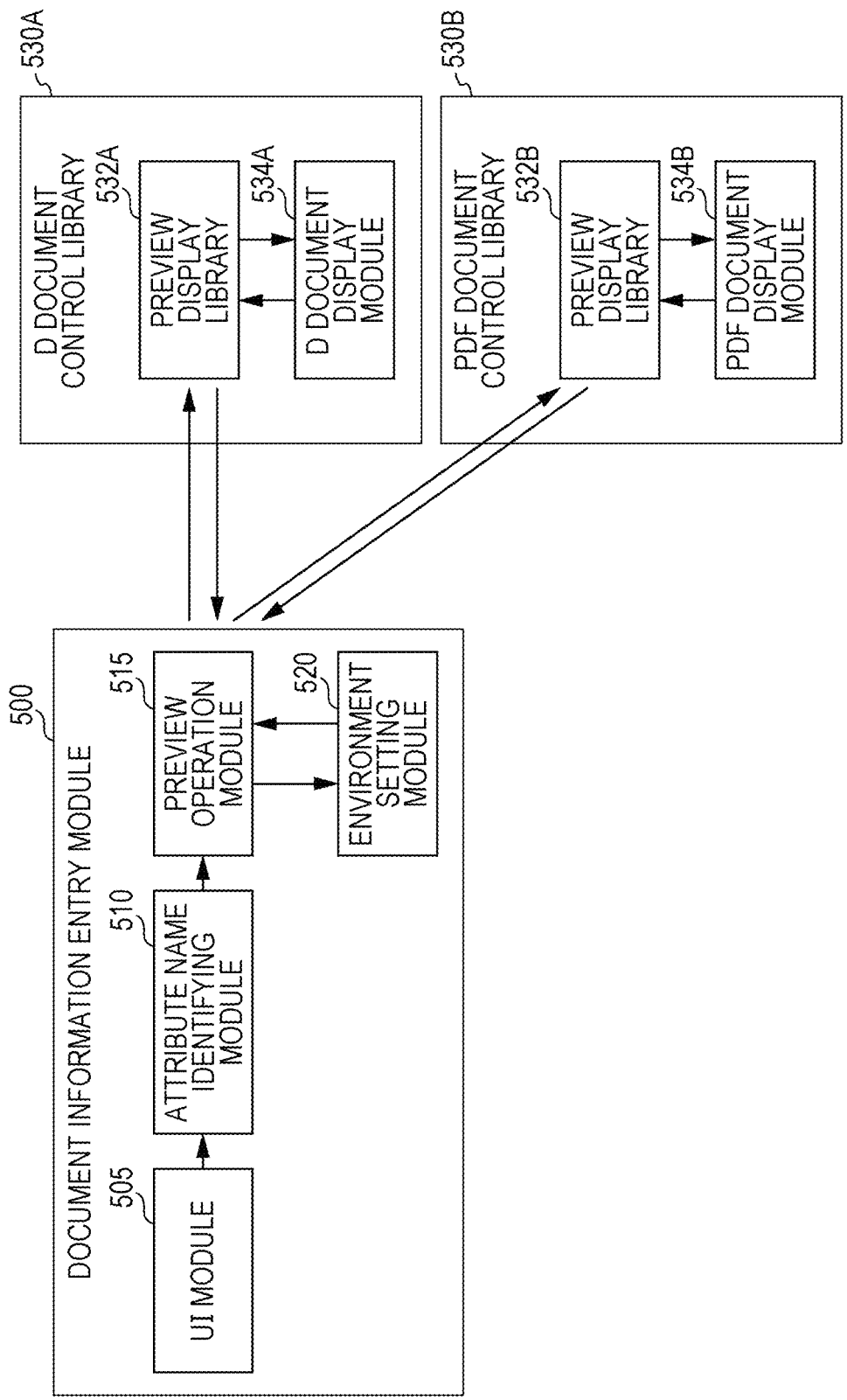
FIG. 5 is a block diagram illustrating specific modules forming an example of the configuration of the exemplary embodiment.

FIG. 5 is a block diagram illustrating specific modules forming an example of the configuration of the exemplary embodiment. This module configuration will be explained below in comparison with that shown in FIG. 1.

A document information entry module 500 includes a UI module 505, an attribute name identifying module 510, a preview operation module 515, and an environment setting module 520. The document information entry module 500 is connected to a preview display library 532A of a D document control library 530A and a preview display library 532B of a PDF document control library 530B.

The UI module 505 corresponds to the UI module 135. The attribute name identifying module 510 corresponds to the attribute processing module 145. The preview operation module 515, the D document control library 530A, and the PDF document control library 530B correspond to the preview processing module 140. The environment setting module 520 corresponds to the display information storage module 125.

The UI module 505 is connected to the attribute name identifying module 510. The attribute name identifying module 510 is connected to the UI module 505 and the preview operation module 515. The preview operation module 515 is connected to the attribute name identifying module 510 and the environment setting module 520. The environment setting module 520 is connected to the preview operation module 515.

The D document control library 530A includes the preview display library 532A and a D document display module 534A. The preview display library 532A is connected to the document information entry module 500 and the D document display module 534A. The D document display module 534A is connected to the preview display library 532A.

The PDF document control library 530B includes the preview display library 532B and a PDF document display module 534B. The preview display library 532B is connected to the document information entry module 500 and the PDF document display module 534B. The PDF document display module 534B is connected to the preview display library 532B.

Regarding attribute setting processing, the individual modules execute processing as follows.

(1) Upon the UI module 505 detecting that a user has selected any one of the attributes within the attribute appending region 350, and more specifically, any one of the rows in the attribute appending region 350, the attribute name identifying module 510 obtains the document type of a displayed document 320 and the selected attribute name from the UI module 505. The attribute name identifying module 510 then supplies information indicating the document type and the attribute name to the preview operation module 515.

(2) The preview operation module 515 obtains a current preview display position, which is an example of display portion information, from the preview display library 532. The preview operation module 515 switches the library to be used in accordance with the type (extension) of document. In the example in FIG. 5, two document control libraries 530, which are the D document control library 530A and the PDF document control library 530B, are used. Three or more document control libraries 530 may be used.

(3) The preview operation module 515 stores the preview display position, which is an example of display portion information, obtained from the preview display library 532 in the environment setting module 520 in association with the document type and the attribute name received from the attribute name identifying module 510.

Regarding automatic switching processing for preview display, the individual modules execute processing as follows.

(1) Upon the UI module 505 detecting that a user has selected any one of the attributes within the attribute appending region 350, and more specifically, any one of the rows in the attribute appending region 350, the attribute name identifying module 510 obtains the document type of a displayed document 320 and the selected attribute name from the UI module 505. The attribute name identifying module 510 then supplies information indicating the document type and the attribute name to the preview operation module 515.

(2) The preview operation module 515 obtains information concerning the preview display position associated with the document type and the attribute name from the environment setting module 520.

(3) The preview operation module 515 supplies the preview display information to the preview display library 532.

(4) The preview display library 532 switches preview display in accordance with the preview display information supplied from the preview operation module 515.

Figure 6:
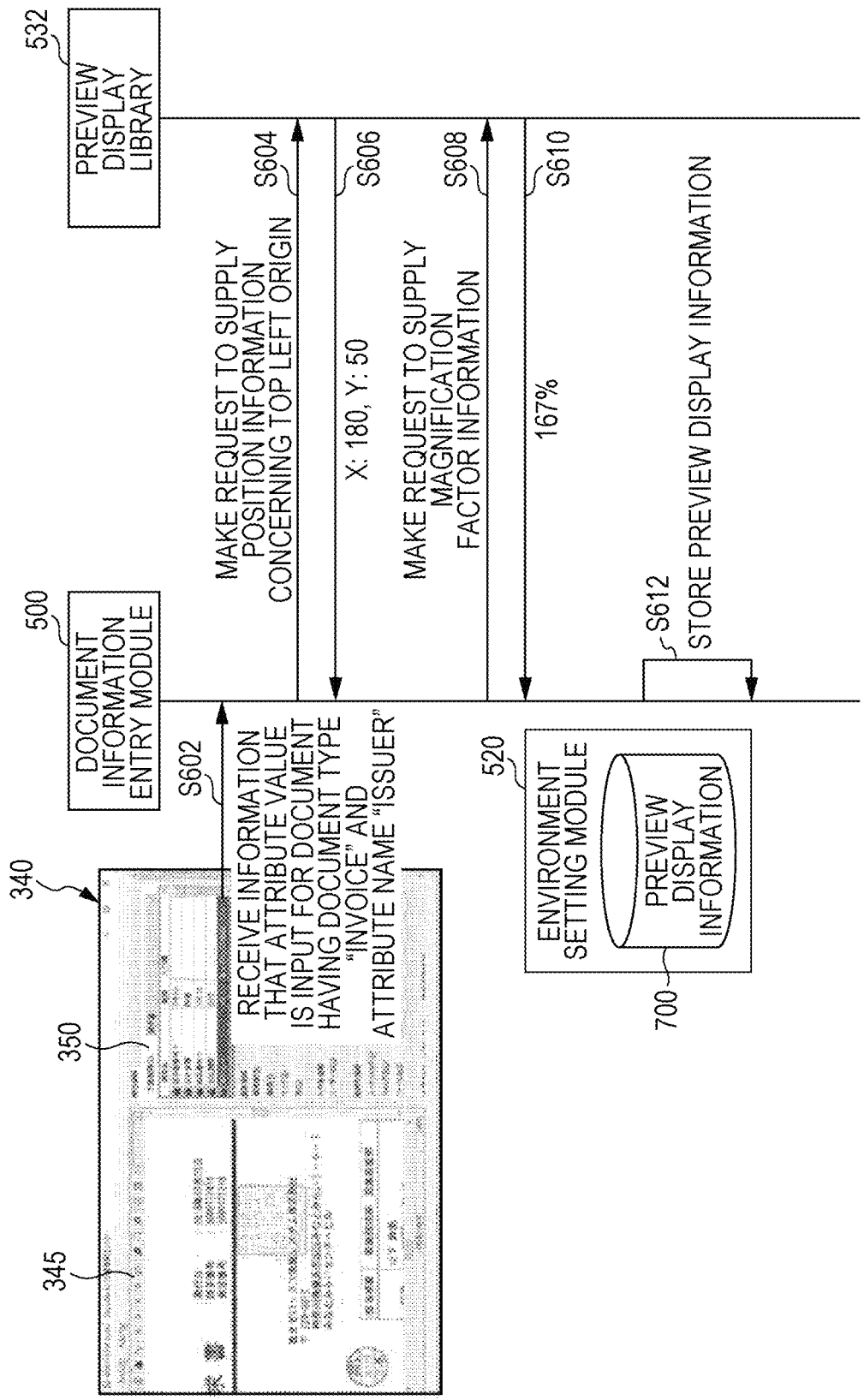
FIG. 6 is a flowchart illustrating an example of processing in the exemplary embodiment.

FIG. 6 is a flowchart illustrating an example of processing in the exemplary embodiment. More specifically, FIG. 6 illustrates an example of processing for storing information indicating a preview position and a magnification factor used by a user when the user is inputting an attribute, in association with the document type and attribute information.

In step S602, for a document whose document type is the invoice and attribute name is the issuer, an attribute value is input in response to an instruction from a user. The document information entry module 500 receives this information.

In step S604, the document information entry module 500 requests the preview display library 532 to supply position information concerning the top left origin of a current display position (that is, the display position of the time point at which the attribute value is input). The position information concerning the top left origin is information for indicating a portion of a document 320 currently displayed in the preview region 345, and more specifically, information indicating to which position of the document 320 the position of the top left origin in the preview region 345 corresponds.

In step S606, the preview display library 532 returns "X:180, Y:50", which is the position information concerning the top left origin, to the document information entry module 500. "X:180, Y:50" represents that the document 320 is currently displayed such that the X coordinate "180" and the Y coordinate "50" of the document 320 is adjusted to the top left of the preview region 345.

In step S608, the document information entry module 500 requests the preview display library 532 to supply magnification factor information indicating the current magnification factor. The magnification factor information is information indicating the magnification factor of the document 320 currently displayed in the preview region 345.

In step S610, the preview display library 532 returns "167%" to the document information entry module 500. "167%" represents that the document 320 is enlarged to 167% and is displayed in the preview region 345.

In step S612, the document information entry module 500 stores the information obtained in steps S606 and S610 in the environment setting module 520 as preview display information 700. An example of the preview display information 700 will be explained below with reference to FIG. 7.

FIG. 7 illustrates an example of the data structure of the preview display information 700. The preview display information 700 has a document type field 705, an attribute name field 710, a position field 715, and a magnification factor field 720. The document type field 705 indicates the document type of a document. The attribute name field 710 indicates the attribute name of the document. The position field 715 indicates the position of the document. The magnification factor field 720 indicates the magnification factor of the document.

The first row of the preview display information 700 indicates that the document type is "Invoice", the attribute name is "Issuer", the position is "X:180, Y:50", and the magnification factor is "167%". The second row indicates that the document type is "Invoice" and the attribute name is "Invoice No.". The third row indicates that the document type is "Invoice" and the attribute name is "Total amount". In the first row, the values are stored in the position field 715 and the magnification factor field 720 as a result of executing the processing shown in FIG. 6. For the second and third rows, the position field 715 and the magnification factor field 720 are left blank because the user has not yet input an attribute value.

Figure 8:
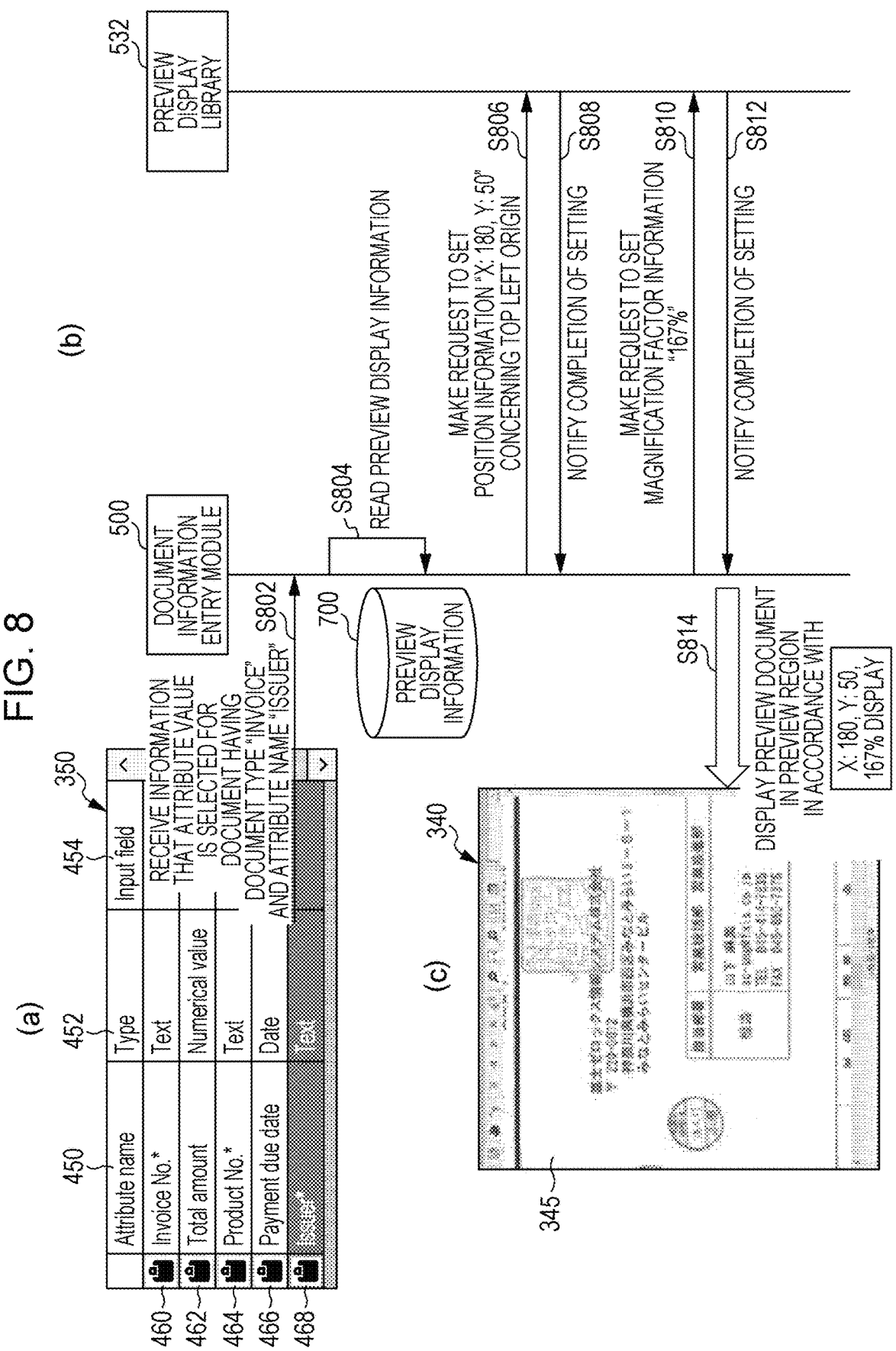
FIG. 8 is a flowchart illustrating an example of processing in the exemplary embodiment.

FIG. 8 is a flowchart illustrating an example of processing in the exemplary embodiment. More specifically, FIG. 8 illustrates an example of processing for switching preview display. When a user is appending a different attribute value to a document with a user interface, and more specifically, when the row of the attribute appending region 350 is switched, the preview display position information indicated by the preview display information 700 is read from the environment setting module 520 based on the document type and the attribute name of the document, and then, preview display is switched.

In step S802, for a document whose document type is the invoice and attribute name is the issuer, the attribute value is selected in response to an instruction from a user. The document information entry module 500 receives this information.

In step S804, the document information entry module 500 reads the preview display information 700 corresponding to the information received in step S802. More specifically, the document information entry module 500 extracts from the preview display information 700 the position field 715 and the magnification factor field 720 corresponding to the document whose document type is the invoice and attribute name is the issuer.

In step S806, the document information entry module 500 requests the preview display library 532 to set the position information "X: 180, Y:50" concerning the top left origin. That is, the document information entry module 500 supplies the value in the position field 715 extracted in step S804 to the preview display library 532.

In step S808, the preview display library 532 notifies the document information entry module 500 that the position information concerning the top left origin has been set.

In step S810, the document information entry module 500 requests the preview display library 532 to set the magnification factor information "167%". That is, the document information entry module 500 supplies the value in the magnification factor field 720 extracted in step S804 to the preview display library 532.

In step S812, the preview display library 532 notifies the document information entry module 500 that the magnification factor information has been set.

In step S814, the preview display library 532 displays the document in a preview mode in the preview region 345 in accordance with "X: 180, Y:50, 167% display". That is, the same portion as the display portion of the document 320 in the preview region 345 shown in FIG. 6 is displayed in the preview region 345. If the document is different from that in FIG. 6, the display content is different. However, the document type (invoice) of the document in FIG. 6 is the same as that in FIG. 8, and the attribute name (issuer) in FIG. 6 is also the same as that in FIG. 8. That is, in FIG. 8, when inputting an attribute value of the issuer, a user merely selects the fifth row 468 of the attribute appending region 350 to display a portion of the document 320 to be checked without having to scroll on the document 320 or to enlarge or reduce the size of the document 320.

Figure 9:
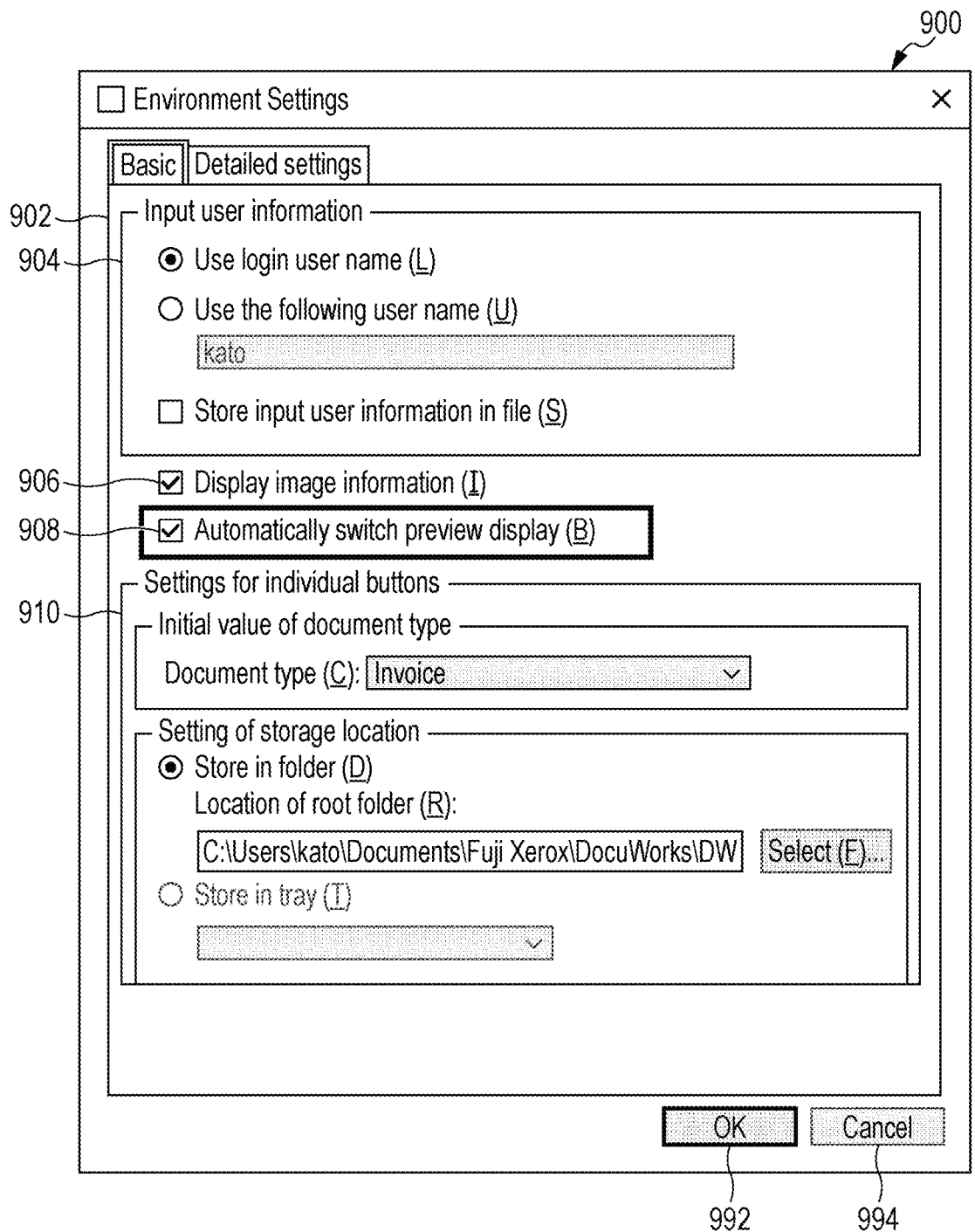
FIG. 9 illustrates an example of setting processing in the exemplary embodiment.

FIG. 9 illustrates an example of setting processing in the exemplary embodiment. More specifically, FIG. 9 illustrates processing for setting ON or OFF for preview-display automatic switching. That is, a user can select whether to turn ON preview-display automatic switching by using an environment setting screen 900.

On the environment setting screen 900, a basic information setting section 902 is displayed. In the basic information setting section 902, an input-user information setting region 904, an image information display setting check box 906, a preview display setting check box 908, a button information setting region 910, an OK button 992, and a cancel button 994 are displayed.

In the input-user information setting region 904, the user name to be used can be set, and a setting regarding whether to store input-user information in a file can also be set.

In the image information display setting check box 906, a setting regrading whether to display image information can be set.

In the preview display setting check box 908, a setting regarding whether to automatically switch preview display can be set. If the preview display setting check box 908 is checked (ON), the preview display position is automatically stored in association with the document type and the attribute name. Then, the preview display position is automatically switched in accordance with the attribute input by a user.

In the button information setting region 910, the initial value of the document type and the storage location of a document can be set.

When a user has selected the OK button 992, the settings selected in the environment setting screen 900 are set. When the user has selected the cancel button 994, the settings selected in the environment setting screen 900 are canceled, and the environment returns to the previous settings.

Figure 10:
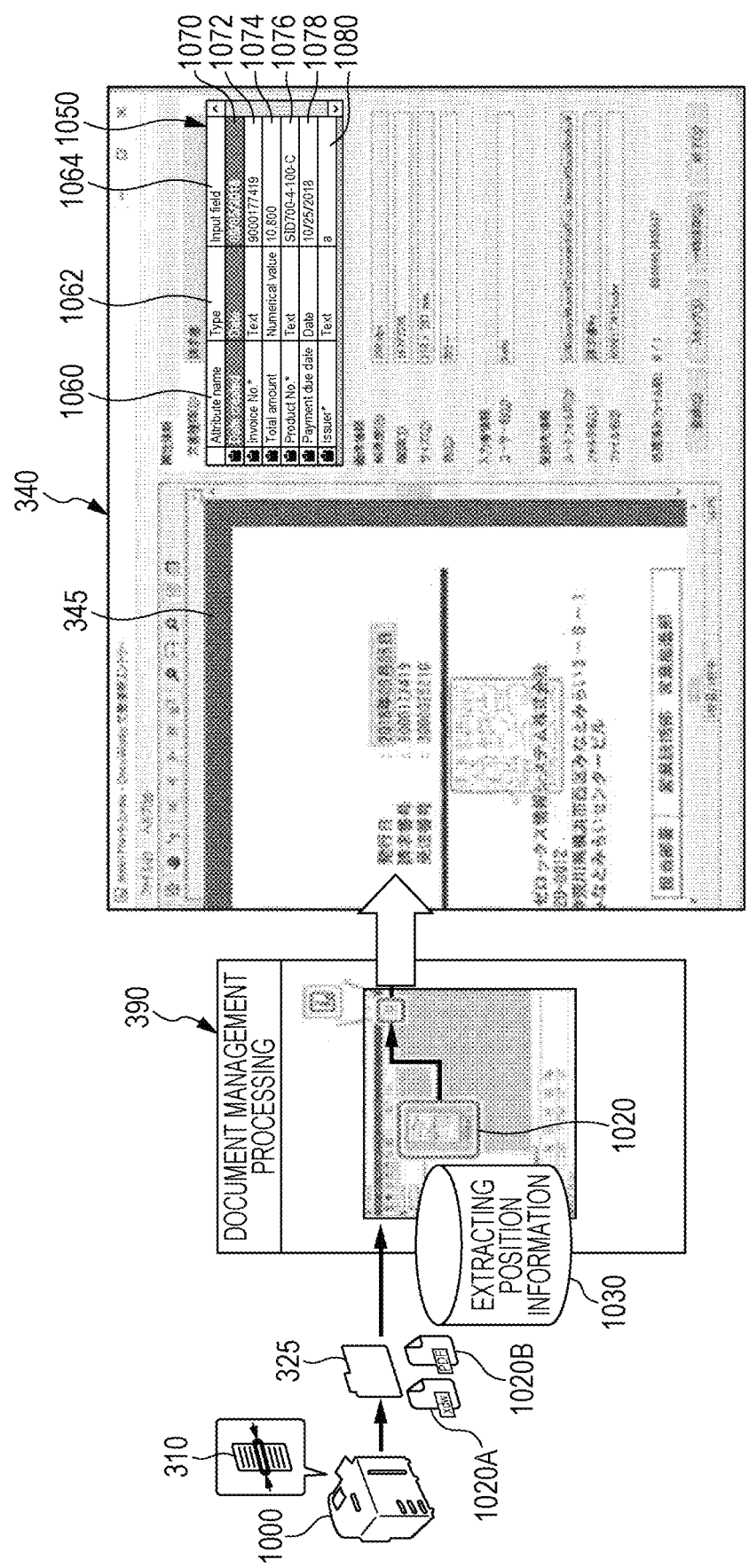
FIG. 10 illustrates an example of processing in the exemplary embodiment.

FIG. 10 illustrates an example of processing in the exemplary embodiment. More specifically, FIG. 10 illustrates an example of processing for prioritization in preview-display automatic switching.

For example, with the use of an option function of an image processing apparatus 1000 or a certain function of the information processing apparatus 100, the following processing may be executed. Character recognition processing is performed on a document image. Then, a predetermined character string is extracted from the character recognition result, and position information corresponding to the extracted character string is supplied to the preview processing module 140. In this case, the supplied position information is prioritized over the existing preview display position information. The preview display position and the magnification factor are then changed in accordance with the supplied position information, and the extracted character string is highlighted.

A user first causes the image processing apparatus 1000 corresponding to the above-described image processing apparatus 200 to scan and digitize the paper document 310 so as to generate a document 1020. The user then stores the document 1020 in the predetermined folder 325. With the option function of the image processing apparatus 1000 or the certain function of the information processing apparatus 100, extracting position information 1030 is extracted.

Extraction processing for the extracting position information 1030 by using a key/value extracting table 1100 shown in FIG. 11 will be discussed later. Details of the extracting position information 1030 will be discussed later with reference to FIG. 12.

The document management processing 390 is executed with the user terminal 220, for example. As a result of executing the document management processing 390, the document 1020 stored in the folder 325 of the image processing apparatus 1000 is read into the user terminal 220 and is displayed on the display 187. When the user selects the document attribute appending button 335 in the state in which the document 1020 is being selected, the document attribute appending processing 392 is started.

As a result of the user selecting the document attribute appending button 335, the document attribute appending screen 340 is displayed. The document attribute appending screen 340 at least includes the preview region 345 and an attribute appending region 1050.

The user appends an attribute to the document 1020 in the attribute appending region 1050 while checking the document 1020 displayed in the preview region 345. However, attribute values are already set in an input field 1064 of the attribute appending region 1050. That is, the user is not required to input attribute values into the input field 1064. The user simply selects a certain row of the attribute appending region 1050 in which the attribute value is already input in the input field 1064, and merely checks the attribute value with the counterpart in the document 1020 within the preview region 345. If an error is found in the attribute value of the input field 1064, the user corrects the attribute value. In the input field 1064 of a first row 1070 of the attribute appending region 1050, "Sep. 5, 2018" is set. In the input field 1064 of a second row 1072, "9000177419" is set. In the input field 1064 of a third row 1074, "10,800" is set. In the input field 1064 of a fourth row 1076, "SID700-4-100-C" is set. In the input field 1064 of a fifth row 1078, "Oct. 25, 2018" is set. In the input field 1064 of a sixth row 1080, "a" is set.

FIG. 11 illustrates an example of the data structure of the key/value extracting table 1100. More specifically, FIG. 11 illustrates an example of the rule for extracting a predetermined character string and a character string having a predetermined positional relationship with the predetermined character string.

The key/value extracting table 1100 has a key field 1105 and a value extracting rule field 1110. In the key field 1105, a key is stored. In the value extracting rule field 1110, a value extracting rule is stored.

The first row of the key/value extracting table 1100 indicates that the value extracting rule for the key "Invoice number" is to extract ten digits of alphanumeric characters placed on the right side of the invoice number, as "Invoice No.". As discussed above, with the option function of the image processing apparatus 1000 or the certain function of the information processing apparatus 100, the attribute value is extracted in accordance with the key/value extracting table 1100. More specifically, with the option function of the image processing apparatus 1000 or the certain function of the information processing apparatus 100, character recognition processing is performed on a character image in the document 1020, and if the characters in the key field 1105 are found in the character recognition result, the attribute value is extracted in accordance with the rule described in the value extracting rule field 1110. This makes it possible to extract a predetermined character string and a character string having a predetermined positional relationship with the predetermined character string. At this time, an extracting position information table 1200 is also extracted.

FIG. 12 illustrates an example of the data structure of the extracting position information table 1200. The extracting position information table 1200 has a document type field 1205, an attribute name field 1210, a position field 1215, a magnification factor field 1220, and an attribute value field 1225. The document type field 1205 indicates the document type of a document. The attribute name field 1210 indicates the attribute name of the document. The position field 1215 indicates the position in the document at which this attribute name is described. The magnification factor field 1220 indicates the magnification factor. The attribute value field 1225 indicates the attribute value of the attribute.

For example, the first row of the extracting position information table 1200 indicates that the document type is "Invoice", the attribute name is "Invoice No.", the position in the document at which "Invoice No." is described is "X:170, Y:35", the magnification factor is "200%", and the attribute value is "9000177419".

As the magnification factor, the value is set so that the extracted character string can be displayed with a predetermined size within the preview region 345. For example, the original size (100%) of "9000177419" in the attribute value field 1225 in FIG. 12 in the preview region 345 is 8 points. If the predetermined size is 16 points, 200% is set in the magnification factor field 1220.

Figure 13:
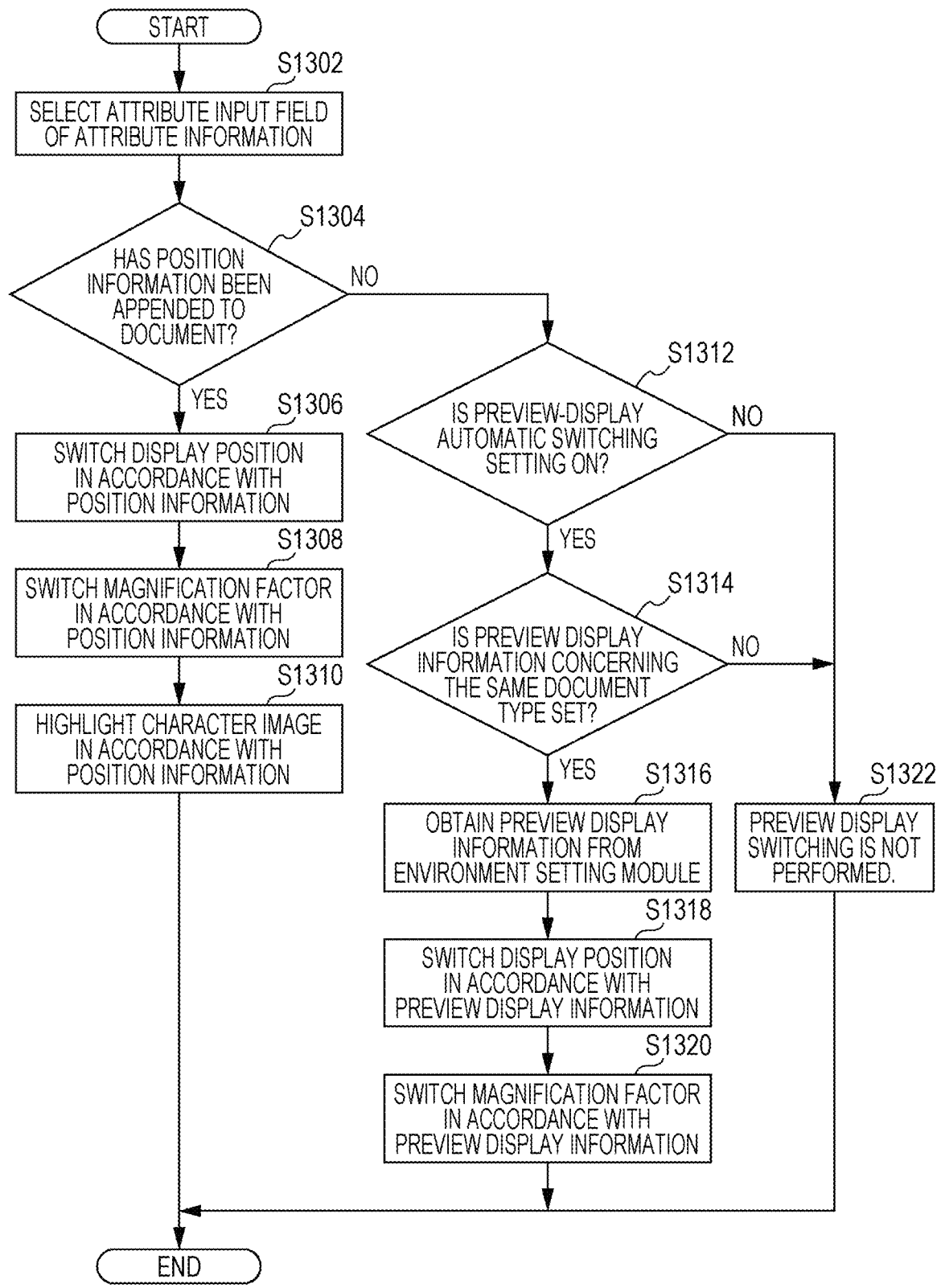
FIG. 13 is a flowchart illustrating an example of processing in the exemplary embodiment.

FIG. 13 is a flowchart illustrating an example of processing in the exemplary embodiment.

In step S1302, the attribute input field of attribute information is selected in response to a user operation.

In step S1304, it is judged whether position information (extracting position information 1030 in FIG. 10) has been appended to a document. If position information has been appended, the process proceeds to step S1306. If position information has not been appended, the process proceeds to step S1312.

In step S1306, the display position is switched in accordance with the position information.

In step S1308, the magnification factor is switched in accordance with the position information.

In step S1310, the character image corresponding to the attribute value indicated by the attribute information selected in step S1302 is highlighted in accordance with the position information. The character image is highlighted in any manner if it can be distinguished from other character images. For example, the character image or its background is displayed in red or the character image blinks.

In step S1312, it is judged whether preview-display automatic switching setting is ON. If this setting is ON, the process proceeds to step S1314. If this setting is not ON, the process proceeds to S1322.

In step S1314, it is judged whether preview display information concerning the same document type as this document is set. If such preview display information is set, the process proceeds to step S1316. If such preview display information is not set, the process proceeds to step S1322.

In step S1316, the preview display information is obtained from the environment setting module 520.

In step S1318, the display position is switched in accordance with the preview display information.

In step S1320, the magnification factor is switched in accordance with the preview display information. Steps S1316 through S1320 are equivalent to the processing shown in FIG. 8. That is, preview display is switched in accordance with the preview display position information concerning the same document type to which the attribute value has already been input.

In step S1322, preview display switching is not performed. That is, the attribute of this document type has not yet been input, and attribute input processing by a user, such as that shown in FIG. 6, will be executed.

The above-described program may be stored in a recording medium and be provided. The program recorded on a recording medium may be provided via a communication medium. In this case, the above-described program may be implemented as a "non-transitory computer readable medium storing the program therein" in the exemplary embodiment.

The "non-transitory computer readable medium storing a program therein" is a recording medium storing a program therein that can be read by a computer, and is used for installing, executing, and distributing the program.

Examples of the recording medium are digital versatile disks (DVDs), and more specifically, DVDs standardized by the DVD Forum, such as DVD+R, DVD-RW, and DVD-RAM, DVDs standardized by the DVD+RW Alliance, such as DVD+R and DVD+RW, compact discs (CDs), and more specifically, a CD read only memory (CD-ROM), a CD recordable (CD-R), and a CD rewritable (CD-RW), Blu-ray (registered trademark) disc, a magneto-optical disk (MO), a flexible disk (FD), magnetic tape, a hard disk, a ROM, an electrically erasable programmable read only memory (EEPROM) (registered trademark), a flash memory, a RAM, a secure digital (SD) memory card, etc.

The entirety or part of the above-described program may be recorded on such a recording medium and stored therein or distributed. Alternatively, the entirety or part of the program may be transmitted through communication by using a transmission medium, such as a wired network used for a local area network (LAN), a metropolitan area network (MAN), a wide area network (WAN), the Internet, an intranet, or an extranet, a wireless communication network, or a combination of such networks. The program may be transmitted by using carrier waves.

The above-described program may be the entirety or part of another program, or may be recorded, together with another program, on a recording medium. The program may be divided and recorded on plural recording media. The program may be recorded in any form, for example, it may be compressed or encrypted, as long as it can be reconstructed.

In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
    a memory configured to:
        memorize a portion of a document associated with a document type of the document and an attribute attached to the document, the portion was being displayed when the attribute was inputted to the displayed document by user, and
    a processor configured to:
        receive a selection of a first attribute from a user, in an appending region other than a region of a first document,
        display a first portion of the first document, when the selection is received, the first portion is memorized with a first document type of the first document and the first attribute of the first document,
    wherein the portion comprises a plurality of character regions comprising information that is capable of serving to reproduce a display state of the portion, the first portion is a desired character region among the plurality of character regions,
    wherein the document type is a category of a plurality of documents having the same format, the format comprises a form, a template, or a pattern of the plurality of documents.

2. The information processing apparatus according to claim 1, wherein the processor is configured to:
    add, to the memory, information on the first document to associate the first portion of the first document that was being displayed, when the selection is received, with the first document type of the first document and the first attribute of the first document.

3. The information processing apparatus according to claim 1, wherein:
    the first document is an image; and
    the processor is configured to:
        perform character recognition on the first document, and
        when displaying the first portion of the first document, display a portion that includes a character string that corresponds to the first attribute specified by the user.

4. The information processing apparatus according to claim 3, wherein the displaying of the portion that includes the character string that corresponds to the first attribute specified by the user is in response to a predetermined character string and a character string having a predetermined positional relationship with the predetermined character string having been extracted.

5. The information processing apparatus according to claim 1,
    wherein the first portion of the first document is displayed within a preview region representing a specific position and a specific magnification of the first document.

6. The information processing apparatus according to claim 1,
    wherein the attribute is information appended to the document without changing a content of the document.

7. A non-transitory computer readable medium storing a program causing a computer to execute a process, the process comprising:
    memorizing a portion of a document associated with a document type of the document and an attribute attached to the document, the portion was being displayed when the attribute was inputted to the displayed document by user,
    receiving a selection of a first attribute from a user, in an appending region other than a region of a first document,
    displaying a first portion of the first document, when the selection is received, the first portion is memorized with a first document type of the first document and the first attribute of the first document,
    wherein the portion comprises a plurality of character regions comprising information that is capable of serving to reproduce a display state of the portion, the first portion is a desired character region among the plurality of character regions,
    wherein the document type is a category of a plurality of documents having the same format, the format comprises a form, a template, or a pattern of the plurality of documents.

8. An information processing method comprising:
    memorizing a portion of a document associated with a document type of the document and an attribute attached to the document, the portion was being displayed when the attribute was inputted to the displayed document by user,
    receiving a selection of a first attribute from a user, in an appending region other than a region of a first document,
    displaying a first portion of the first document, when the selection is received, the first portion is memorized with a first document type of the first document and the first attribute of the first document,
    wherein the portion comprises a plurality of character regions comprising information that is capable of serving to reproduce a display state of the portion, the first portion is a desired character region among the plurality of character regions,
    wherein the document type is a category of a plurality of documents having the same format, the format comprises a form, a template, or a pattern of the plurality of documents.

* * * * *